US010162094B2

(12) United States Patent
Zhou

(10) Patent No.: US 10,162,094 B2
(45) Date of Patent: Dec. 25, 2018

(54) LIGHT SOURCE ASSEMBLY, BACKLIGHT MODULE AND CURVE DISPLAY APPARATUS

(71) Applicants: BOE Technology Group Co., Ltd., Beijing (CN); Beijing BOE Display Technology Co., Ltd., Beijing (CN)

(72) Inventor: Junli Zhou, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 135 days.

(21) Appl. No.: 14/802,202

(22) Filed: Jul. 17, 2015

(65) Prior Publication Data
US 2016/0124138 A1 May 5, 2016

(30) Foreign Application Priority Data
Oct. 30, 2014 (CN) .......................... 2014 1 0598571

(51) Int. Cl.
*F21V 7/04* (2006.01)
*F21V 8/00* (2006.01)

(52) U.S. Cl.
CPC .......... *G02B 6/0045* (2013.01); *G02B 6/0011* (2013.01); *G02B 6/0068* (2013.01);
(Continued)

(58) Field of Classification Search
CPC .. G02B 6/0045; G02B 6/0011; G02B 6/0068; G02B 6/005; G02B 6/0065; G02B 6/0073
(Continued)

(56) References Cited

U.S. PATENT DOCUMENTS 9,568,788 B2 * 2/2017 Shibahara ............. G02F 1/1333
2010/0208494 A1 * 8/2010 Kuo ....................... G02B 6/002
362/612
(Continued)

FOREIGN PATENT DOCUMENTS

CN 101290445 A 10/2008
CN 102445774 A 5/2012
(Continued)

OTHER PUBLICATIONS

Second Office Action, including Search Report, for Chinese Patent Application No. 201410598571.X, dated Jul. 20, 2016, 11 pages.
(Continued)

*Primary Examiner* — Bao Q Truong
*Assistant Examiner* — Matthew Peerce
(74) *Attorney, Agent, or Firm* — Westman, Champlin & Koehler, P.A.

(57) ABSTRACT

The present disclosure provides a light source assembly, a backlight module and a curve display apparatus. It relates to the technical field of display, may improve the light incidence ratio of a light guide plate in the curve display apparatus and enhance the uniformity of the picture brightness. The light source assembly includes a light guide plate and a LED lamp bar, wherein the light guide plate is a curve light guide plate and the LED lamp bar is an arc-shaped lamp bar which has a curvature matched with the curvature of the curve light guide plate, and wherein the curve light guide plate has a set of straight sides parallel to each other and a set of curve sides having the same curvature, the arc-shaped lamp bar being arranged on a side of the curve light guide plate with the curve sides.

10 Claims, 3 Drawing Sheets

(52) U.S. Cl.
CPC ............ *G02B 6/005* (2013.01); *G02B 6/0065* (2013.01); *G02B 6/0073* (2013.01)

(58) Field of Classification Search
USPC ......................................................... 362/606
See application file for complete search history.

(56) References Cited

U.S. PATENT DOCUMENTS

| | | | |
|---|---|---|---|
| 2011/0096262 A1* | 4/2011 | Kikuchi | ................. G09F 9/301 |
| | | | 349/58 |
| 2013/0100357 A1 | 4/2013 | Yokawa et al. | |
| 2013/0169907 A1 | 7/2013 | Wang et al. | |
| 2014/0331532 A1* | 11/2014 | Deppiesse | ............... F21S 4/005 |
| | | | 40/541 |
| 2016/0079336 A1* | 3/2016 | Youn | ................... H01L 23/4985 |
| | | | 257/40 |

FOREIGN PATENT DOCUMENTS

| | | |
|---|---|---|
| CN | 102540537 A | 7/2012 |
| CN | 203858384 U | 10/2014 |
| CN | 203909434 U | 10/2014 |
| EP | 2 587 303 A2 | 5/2013 |
| JP | 2014-56772 A | 3/2014 |
| JP | 2014-204078 A | 10/2014 |

OTHER PUBLICATIONS

First Office Action, including Search Report, for Chinese Patent Application No. 201410598571.X, dated Feb. 1, 2016, 11 pages.
Rejection Decision for Chinese Patent Application No. 201410598571.X, dated Dec. 28, 2016, 13 pages.

\* cited by examiner

LIGHT SOURCE ASSEMBLY, BACKLIGHT MODULE AND CURVE DISPLAY APPARATUS

CROSS-REFERENCE TO RELATED APPLICATION

This application claims the benefit of Chinese Patent Application No. 201410598571.X filed on Oct. 30, 2014 in the State Intellectual Property Office of China, the whole disclosure of which is incorporated herein by reference.

BACKGROUND OF THE INVENTION

Field of the Invention

The present disclosure relates to a technical field of display, and in particular, relates to a light source assembly, a backlight module and a curve display apparatus.

Description of the Related Art

The conventional LCD (liquid crystal display) has a poor capability of displaying picture at an edge of a screen. As the display technology develops, a curve liquid crystal display is developed. The curve liquid crystal display has a screen designed as an arc form in entirety, which may provide a wider panoramic image effect. For the user, the display effects on the center of the screen are same to those at the edge of the screen.

At present, the backlight modules in the curve liquid crystal display apparatus are mainly classified into two types in structure, i.e., direct illumination type and side illumination type. As the direct illumination type backlight module impedes thinning of the display apparatus, most of the curve display products use the side illumination type backlight module.

As illustrated in FIG. 1, in the side illumination backlight module, a LED (light emitting diode) lamp bar 20 is provided on a side of the light guide plate 10 with a straight side. The light emitted from the LED lamp bar 20 is reflected and diffused by the light guide plate 10 to form a surface light source so as to provide backlight for the liquid crystal display panel. However, in the curve display product, the curvature of the light guide plate must cause a low light incidence ratio on the side of the light guide plate with the straight side, and thus, the uniformity of the picture brightness is degraded.

SUMMARY OF THE INVENTION

Embodiments of the present invention provide a light source assembly, a backlight module and a curve display apparatus, which may improve the light incidence ratio of the light guide plate in the curve display apparatus and improve the uniformity of the picture brightness.

In order to achieve the above object, the following embodiments are provided.

In an aspect, it provides a light source assembly, comprising a light guide plate and a LED lamp bar, wherein the light guide plate is a curve light guide plate and the LED lamp bar is an arc-shaped lamp bar which has a curvature matched with the curvature of the curve light guide plate, and wherein the curve light guide plate has a set of straight sides parallel to each other and a set of curve sides having the same curvature, the arc-shaped lamp bar being arranged on a side of the curve light guide plate with the curve sides.

In another aspect, it provides a backlight module comprising the above light source assembly.

In a further aspect, it provides a curve display apparatus comprising a display panel and the above backlight module.

BRIEF DESCRIPTION OF THE DRAWINGS

In order that the embodiments of the present invention or the prior art can be described more clearly, the drawings accompanied with the description will be illustrated briefly. Apparently, the following drawings show only some of embodiments of the present invention. The skilled person in the art can obtain other drawings from the following drawings without taking any inventive labors.

Figure 1:
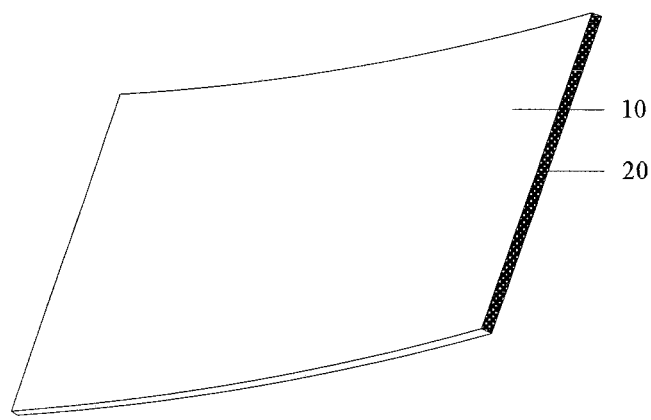
FIG. 1 is a schematic view showing a position relation between a LED lamp bar and a light guide plate of the curve display apparatus in the prior art.

Reference Numerals:

| 10: light guide plate | 101: straight side | 102: curve side | 20: LED lamp bar |
|---|---|---|---|
| 201: circuit board | 202: LED lamp | 30: optical film | |

DETAILED DESCRIPTION OF PREFERRED EMBODIMENTS OF THE INVENTION

Exemplary embodiments of the present disclosure will be described clearly below in detail with reference to drawings. Apparently, the following embodiments are part of the embodiments of the present invention, instead of all of the embodiments. On the basis of the following embodiments, the skilled person in the art can obtain other embodiments without taking inventive labors. All of the other embodiments fall within the scope of the present invention.

Figure 2:
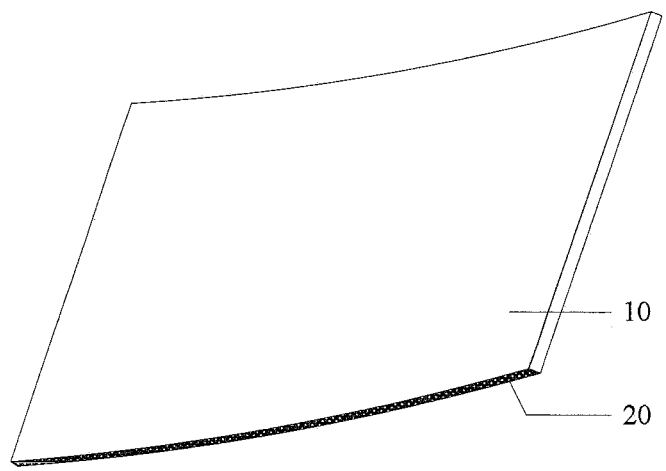
FIGS. 2(a) and 2(b) are schematic views showing a position relation between a LED lamp bar and a light guide plate according to an embodiment of the present invention.
Figure 2:
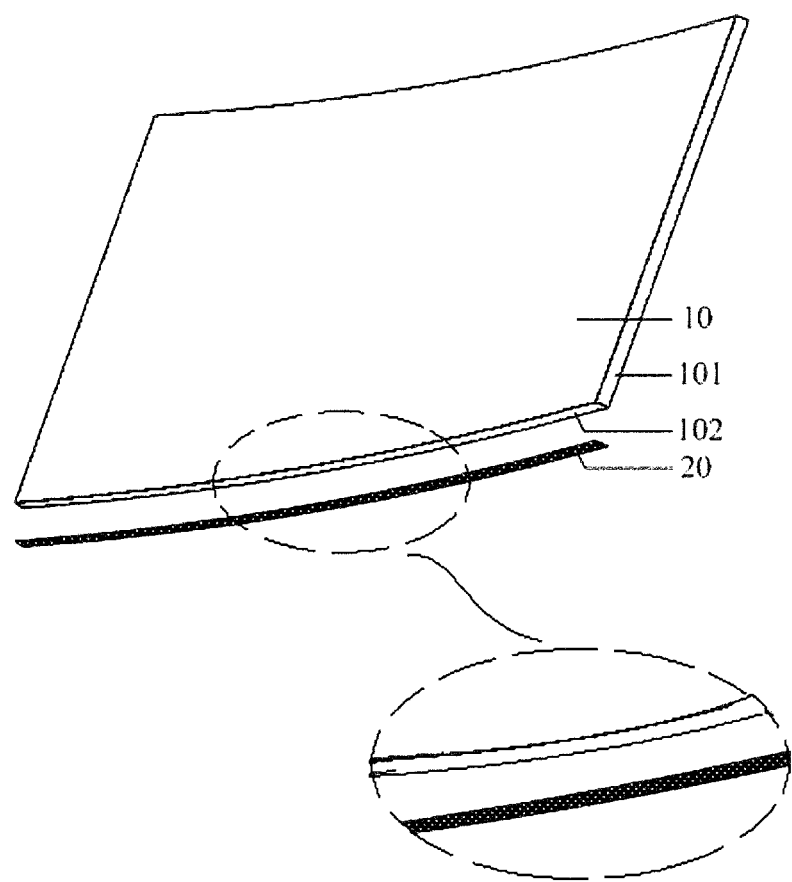

An embodiment of the present invention provides a light source assembly. As illustrated in FIGS. 2(a) and 2(b), the light source assembly includes a light guide plate 10 and a LED lamp bar 20. The light guide plate 10 is a curve light guide plate and the LED lamp bar 20 is an arc-shaped lamp bar which has a curvature matched with the curvature of the curve light guide plate. The curve light guide plate has a set of straight sides 101 parallel to each other and a set of curve sides 102 having the same curvature, the arc-shaped lamp bar being arranged on a side of the curve light guide plate with the curve sides 102.

The light source assembly provided herein mainly includes the light guide plate 10 and the LED lamp bar 20. It may convert a point light source into a surface light source, for providing a backlight to a liquid crystal display panel. In an example, the light guide plate 10 may be made from such as PMMA (poly methyl methacrylate) or PC (polycarbonate).

It should be noted that, at first, the curve light guide plate has a curve form which is the form that the light guide plate 10 has in a curve display product, that is, the form that the light guide plate 10 has after the curve display product is produced and assembled.

In view of this, the curve light guide plate may in particular comprise two cases: in the first case, the light guide plate 10 has a curve form itself, that is, the light guide plate 10 has been formed as the curve form in production, for example, the light guide plate being produced by a mold having a curve molding cavity; or in the second case, the light guide plate 10 has a planar form itself, but is formed by a flexible material, thus, it may be fixed as a curve form by an external means in the curve display product.

In the embodiment of the present invention, the curve light guide plate is only directed to the form of the light guide plate 10 in the curve display product, that is, the final form of the light guide plate 10 when it is applied in the curve display product. As regard to whether it has the curve form or the planar form itself, it is not limited herein.

Secondly, the curvature of the arc-shaped lamp bar matched with the curvature of the curve light guide plate in particular means that, the LED lamp bar 20 and the light guide plate 10 should be curved along the same direction and have curvatures close to each other.

Herein, the LED lamp bar 20 and the light guide plate 10 having curvatures close to each other means that the curvature of the LED lamp bar 20 should be between a tangent plane to the curve light guide plate and the curve light guide plate with respect to the curve light guide plate, and preferably, the curvature of the light guide plate 10 and the curvature of the LED lamp bar 20 are same completely. Certainly, the curvature of the LED lamp bar 20 may also be slightly greater than the curvature of the curve light guide plate such that a higher light incidence ratio can be achieved. It is not limited otherwise.

Thirdly, the arc-shaped lamp bar is provided on a side of the curve light guide plate with the curve sides 102, in particular, it may be arranged on the top side or bottom side of the light guide plate 10. Alternatively, as an example, the arc-shaped lamp bars may also be arranged on both the top side and the bottom side of the light guide plate 10. It should be noted that the top side and the bottom side are the sides of the curve light guide plate with curve sides. If the top side and the bottom side of the curve light guide plate are sides of the curve light guide plate with straight sides while the left side and the right side are sides of the curve light guide plate with curve sides, the arc-shaped lamp bar may be arranged on the left side or right side of the light guide plate 10. Alternatively, as an example, the arc-shaped lamp bar may also be arranged on both the left side and right side of the light guide plate 10.

The embodiment of the present invention provides a light source assembly. The light source assembly includes the light guide plate 10 and the LED lamp bar 20. The light guide plate 10 is a curve light guide plate and the LED lamp bar 20 is an arc-shaped lamp bar which has a curvature matched with the curvature of the curve light guide plate. The curve light guide plate has a set of straight sides 101 parallel to each other and a set of curve sides 102 having the same curvature, the arc-shaped lamp bar being arranged on a side of the curve light guide plate with the curve sides 102.

In view of this, in comparison with the case that the LED lamp bar 20 is arranged on a side of the light guide plate 10 with straight sides in the prior art, the embodiment of the present invention may increase the light incidence ratio of the light guide plate 20 efficiently to prevent the low incidence ratio due to curvature of the light guide plate by providing the LED lamp bar 20 on the side of the curve light guide plate with the curve sides 102 and matching the curvature of the LED lamp bar 20 with the curvature of the curve light guide plate. In view of this, the light having entered the light guide plate does not need to change in a form of arc, but travels in a plane, thus, the uniformity of the picture brightness in the curve display product may be improved significantly.

In an example, preferably, the curvature of the arc-shaped lamp bar is equal to the curvature of the curve light guide plate.

It should be noted that, the curvature may have a positive value or a negative value, thus, the curvature of the arc-shaped lamp bar equal to the curvature of the curve light guide plate means that the arc-shaped lamp bar and the curve light guide plate have the same curve direction and curvature.

In view of this, the arc-shaped lamp bar and the curve light guide plate have completely identical curve direction and curvature. In this way, it may ensure that, when the light emitted from the LED lamp is incident on the side of the light guide plate 10 with curve sides, at the various regions along a direction perpendicular to the straight side of the light guide plate 10, the light entering the respective regions of the light guide plate 10 is substantially uniform, so as to improve the light incidence ratio of the light guide plate 10.

Preferably, the light guide plate 10 has a uniform thickness at all of locations on it.

The LED lamp bar 20 is arranged on the side of the curve light guide plate with curve sides and may emit the light along the same direction for example from down to upper with respect to the curve display product and the light passing various locations does not need to change in a form of an arc during travelling as those in the prior art. Thus, the reflection effects to the incident light become relatively weak, the light loss becomes relatively less, and the uniformity of the picture brightness is improved. Herein the thickness of the light guide plate 10 is arranged to be uniform at all locations, which facilitates uniform light guiding to form a uniform surface light source, so as to further improve the uniformity of the picture brightness in the curve display product.

Figure 3:
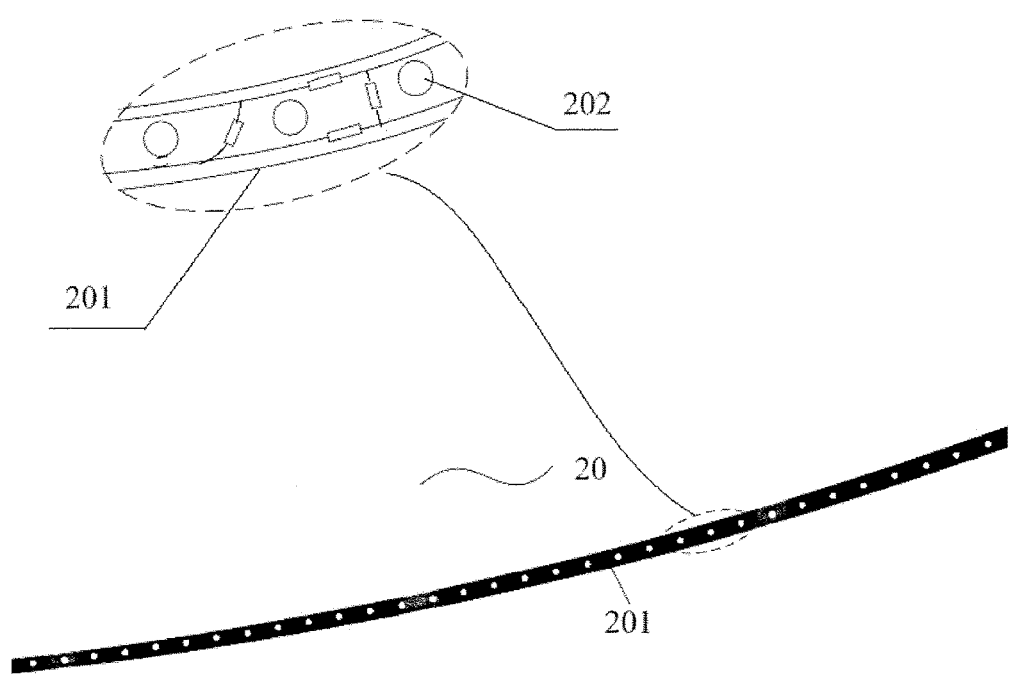
FIG. 3 is a schematic view showing a structure of a LED lamp bar according to an embodiment of the present invention.

In an example, as illustrated in FIG. 3, the LED lamp bar 20 may include a circuit board 201 and a LED lamp 202 fixed on the circuit board 201. The circuit board 201 is an arc-shaped circuit board and the LED lamp 202 is distributed on the arc-shaped circuit board.

In an example, the base material of the circuit board 201 may be such as aluminium base or fiberglass epoxy (FR4) plate copper clad laminate or flexible base material.

Further, in an embodiment of the present invention, preferably, the circuit board 201 is a FPC (flexible printed circuit board).

In an example, the FPC is a printed circuit board which is made from polyamide or polyester film and has high reliability and excellent flexibility. It has advantages of high density of wirings, low weight, low thickness and good flexion.

It should be noted that, in order to ensure the reliability of the wiring connection on the circuit board 201, preferably, the wirings on the circuit board 201 are also designed in an arc form correspondingly while the circuit board 201 is arranged as the arc-shaped circuit board.

For example, on the arc-shaped circuit board, the wirings parallel to the arc-shaped sides of the arc-shaped circuit board may be designed to the same arc as the arc-shaped sides without changing the wirings perpendicular to the arc-shaped sides of the arc-shaped circuit board, and the wirings at an acute angle or an obtuse angle relative to the arc-shaped sides of the arc-shaped circuit board may be adjusted correspondingly. The wirings parallel to or perpendicular to the arc-shaped sides are those parallel to or perpendicular to the tangent directions of the respective locations of the arc-shaped sides.

In this way, by means of adjusting the circuit board 201 and the wirings on the circuit board 201, the problem such as short circuit or breakage caused by the curvature of the circuit board 201 may be avoided so as to improve the reliability of the products.

In an example, the LED lamps 202 may be distributed on the circuit board 201 conforming to the arc design of the circuit board 201 so as to provide point light sources for the light guide plate 10.

In view of this, in the embodiment of the present invention, the circuit board 201 may be directly produced as an arc-shaped circuit board, and the LED lamps 202 are distributed on the arc-shaped circuit board, which may avoid the problem of reliability of products caused by the bending stress applied to the circuit board 201.

Figure 4:
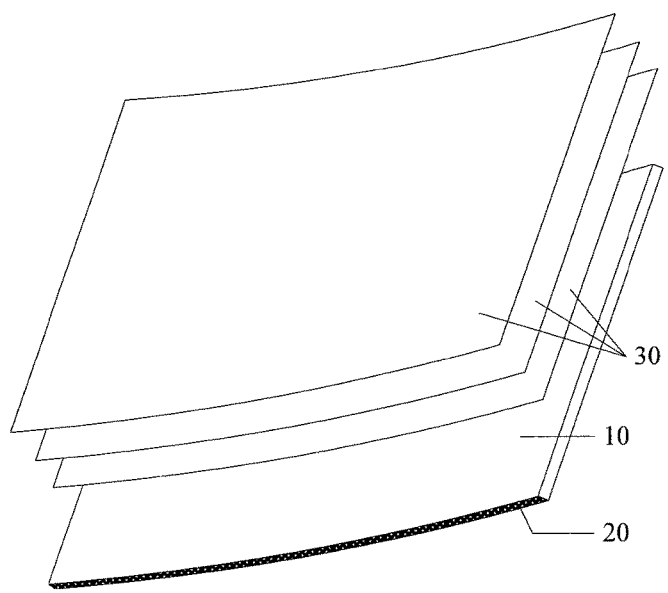
FIG. 4 is a schematic view showing a structure of a backlight module according to an embodiment of the present invention.

An embodiment of the present invention also provides a backlight module, as illustrated in FIG. 4. The backlight module includes the above light source assembly.

In this way, the light source assembly may provide a uniform surface light source as a whole. In view of this, the light source assembly has a higher light incidence ratio and less optical loss, thus, with the same brightness, the power consumption may be reduced efficiently to save energy.

As an example, as shown in FIG. 4, the backlight module may further include an optical film 30. The optical film 30 may include such as a diffusion film, a prism film or a brightening film.

In an example, the optical film 30 may be a curve optical film, and preferably, the curvature of the optical film 30 is equal to the curvature of the light guide plate 10.

An embodiment of the present invention also provides a curve display apparatus including a display panel and the above backlight module.

In an example, the display panel is a curve liquid crystal display panel. The curvature of the curve liquid crystal display panel is matched with the curvatures of the LED lamp bar 20, the light guide plate 10 and the optical film 30 in the above backlight module. Preferably, the curvature of the curve liquid crystal display panel is same to the curvatures of the LED lamp bar 20, the light guide plate 10 and the optical film 30 in the above backlight module.

It should be noted that the curve display apparatus may include products or components having display function, such as a liquid crystal display, a cell phone, a tablet computer, a notebook computer, a TV or an electronic paper.

Although several exemplary embodiments have been shown and described, the present invention is not limited to those and it would be appreciated by those skilled in the art that various changes or modifications may be made in these embodiments without departing from the principles and spirit of the disclosure. These changes or modifications will fall within the scope of the present invention. The scope of the present invention is defined by the appended claims and their equivalents.

What is claimed is:

1. A light source assembly, comprising a light guide plate and a LED lamp bar,
    wherein the light guide plate is a curve light guide plate and the LED lamp bar is an arc-shaped lamp bar which has a curvature corresponding to the curvature of the curve light guide plate, such that the LED lamp bar is fixedly arranged on the surface of side of the curve light guide plate with curve sides;
    wherein the LED lamp bar comprises a circuit board and a LED lamp fixed on the circuit board, and the circuit board is an arc-shaped circuit board,
    wherein the curve light guide plate is in a fixed curve form, the curve light guide plate has a set of straight sides parallel to each other and a set of curve sides having the same curvature, and
    wherein the arc-shaped circuit board comprises a plurality of wirings fixed thereon, the plurality of wirings comprises at least:
    first wirings, the first wirings are shaped to be arc-shaped wirings which are designed to the same arc as and in coincidence with profiles of arc-shaped sides of the arc-shaped circuit board, respectively; second wirings, the second wirings are shaped to be linear wirings which extends straight along directions perpendicular to the arc-shaped sides of the arc-shaped circuit board, respectively; and
    third wirings, the third wirings are wirings which are arranged at an acute angle or an obtuse angle relative to the arc-shaped sides of the arc-shaped circuit board and are adjusted depending on curvature of the arc-shaped circuit board, and
    wherein the LED lamp bar is an arc-shaped lamp bar which has a curvature corresponding to the curvature of the curve light guide plate means that the LED lamp bar and the light guide plate are curved along a same direction and have curvatures close to but not equal to each other.

2. The light source assembly according to claim 1, wherein the light guide plate has a uniform thickness at all of locations on it.

3. The light source assembly according to claim 1, wherein the circuit board is a flexible circuit board.

4. The light source assembly according to claim 1, wherein the curve light guide plate has a curve form which is the form that the light guide plate presents in a curve display product, that is, the form that the light guide plate presents after the curve display product is produced and assembled.

5. The light source assembly according to claim 1, wherein the light guide plate is made from material comprising poly methyl methacrylate or polycarbonate.

6. The light source assembly according to claim 1, wherein the circuit board is made from material comprising aluminium base or fiberglass epoxy plate copper clad laminate or flexible base material.

7. A backlight module comprising the light source assembly according to claim 1.

8. The backlight module according to claim 7, further comprising an optical film which is a curve optical film,
    wherein the curvature of the optical film is equal to the curvature of the light guide plate.

9. A curve display apparatus comprising a display panel and the backlight module according to claim 7.

10. A light source assembly, comprising a light guide plate and a LED lamp bar, wherein the light guide plate is a curve light guide plate and the LED lamp bar is an arc-shaped lamp bar which has a curvature corresponding to the curvature of the curve light guide plate, and wherein the curve light guide plate has a set of straight sides parallel to each other and a set of curve sides having the same curvature, and the arc-shaped lamp bar is arranged on a side of the curve light guide plate with the curve sides;

and wherein the LED lamp bar is an arc-shaped lamp bar which has a curvature corresponding to the curvature of the curve light guide plate means that the LED lamp bar and the light guide plate are curved along a same direction and have curvatures close to but not equal to each other.

\* \* \* \* \*